(12) United States Patent
Griffin et al.

(10) Patent No.: US 7,843,428 B2
(45) Date of Patent: Nov. 30, 2010

(54) WHEELED USER INPUT DEVICE IN COOPERATION WITH A HANDHELD ELECTRONIC COMMUNICATION DEVICE

(75) Inventors: Jason T. Griffin, Kitchner (CA); Steven Fyke, Waterloo (CA)

(73) Assignee: Research In Motion Limited, Waterloo, ON ( * ) Notice: Subject to any disclaimer, the term of this patent is extended or adjusted under 35 U.S.C. 154(b) by 506 days.

(21) Appl. No.: 11/970,382

(22) Filed: Jan. 7, 2008

(65) Prior Publication Data
US 2009/0174655 A1 Jul. 9, 2009

(51) Int. Cl.
*G06F 3/033* (2006.01)
*G09G 5/08* (2006.01)
(52) U.S. Cl. ........................ 345/157; 345/184
(58) Field of Classification Search ................. 345/156, 345/157, 161, 163, 168, 169, 184
See application file for complete search history.

(56) References Cited

U.S. PATENT DOCUMENTS

| | | | | |
|---|---|---|---|---|
| 5,021,771 A | * | 6/1991 | Lachman | 345/164 |
| 5,334,997 A | * | 8/1994 | Scallon | 345/167 |
| 5,561,445 A | * | 10/1996 | Miwa et al. | 345/163 |
| 5,850,213 A | * | 12/1998 | Imai et al. | 428/1.55 |
| 5,864,333 A | * | 1/1999 | O'Heir | 345/157 |
| 7,050,041 B1 | * | 5/2006 | Smith et al. | 345/156 |
| 7,710,409 B2 | * | 5/2010 | Robbin et al. | 345/184 |
| 2005/0024332 A1 | * | 2/2005 | Chen | 345/163 |
| 2009/0201248 A1 | * | 8/2009 | Negulescu et al. | 345/157 |

FOREIGN PATENT DOCUMENTS

| EP | 1806649 A1 | 7/2007 |
|---|---|---|
| WO | 2004059424 A2 | 7/2004 |

OTHER PUBLICATIONS

European Search Report dated May 21, 2008 from European Application 08150074.

* cited by examiner

*Primary Examiner*—Ricardo L Osorio
(74) *Attorney, Agent, or Firm*—Novak Druce + Quigg LLP

(57) ABSTRACT

A handheld wireless communication device includes a device body having a display screen. The display screen is located above a user input device located on a front face of the body. The user input device includes a set of four rotatable wheels, each mounted on an axle having a longitudinal axis oriented substantially perpendicular relative the front face of the body. At least one sensor is operatively associated with the set of four wheels and is configured to sense motion induced in any of the four wheels. Additionally the at least one sensor is further configured to output electronic data representative of sensed wheel motion. The device further includes a microprocessor that is programmed to process input data into cursor guidance instructions that are outputted to the display screen and which affect x-direction and y-direction cursor movement on the display screen in correspondence with the sensed wheel motion.

20 Claims, 13 Drawing Sheets

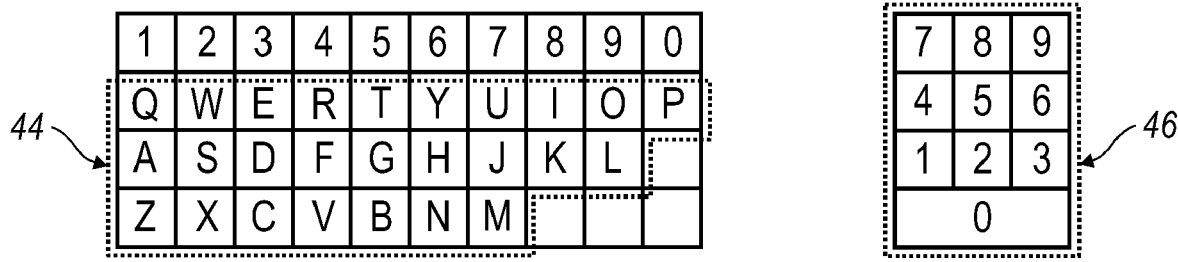
FIG. 4
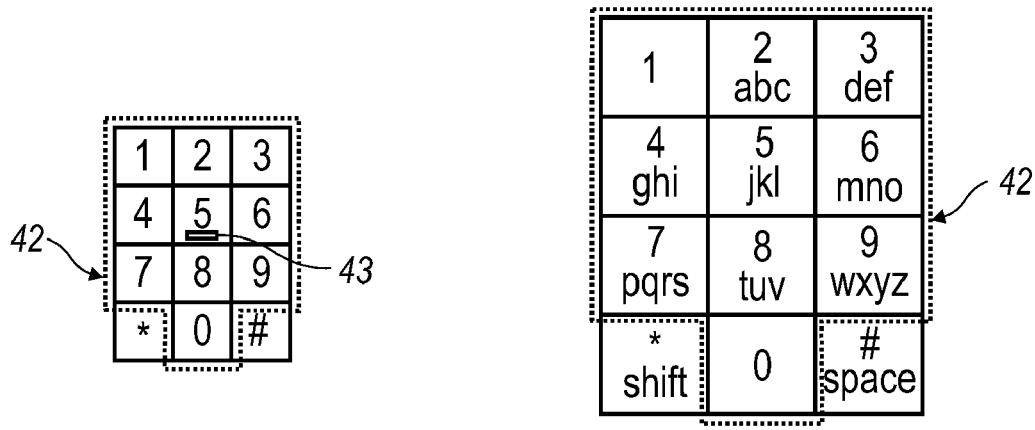
FIG. 5  FIG. 6

US 7,843,428 B2

WHEELED USER INPUT DEVICE IN COOPERATION WITH A HANDHELD ELECTRONIC COMMUNICATION DEVICE

FIELD

This disclosure, in a broad sense, is directed toward a handheld communication device that has wireless communication capabilities and the networks within which the wireless communication device operates. The present disclosure further relates to providing a wheeled user input device for instructing cursor navigation on the display screen of a handheld electronic communication device.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Current solutions for cursor navigation require a substantial depth or provide limited functionality. It is therefore desirable to configure a handheld electronic device so that the depth required for cursor navigation control is decreased and functionality is retained.

BRIEF DESCRIPTION OF THE DRAWINGS

Exemplary methods and arrangements conducted and configured according to the advantageous solutions presented herein are depicted in the accompanying drawings wherein:

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
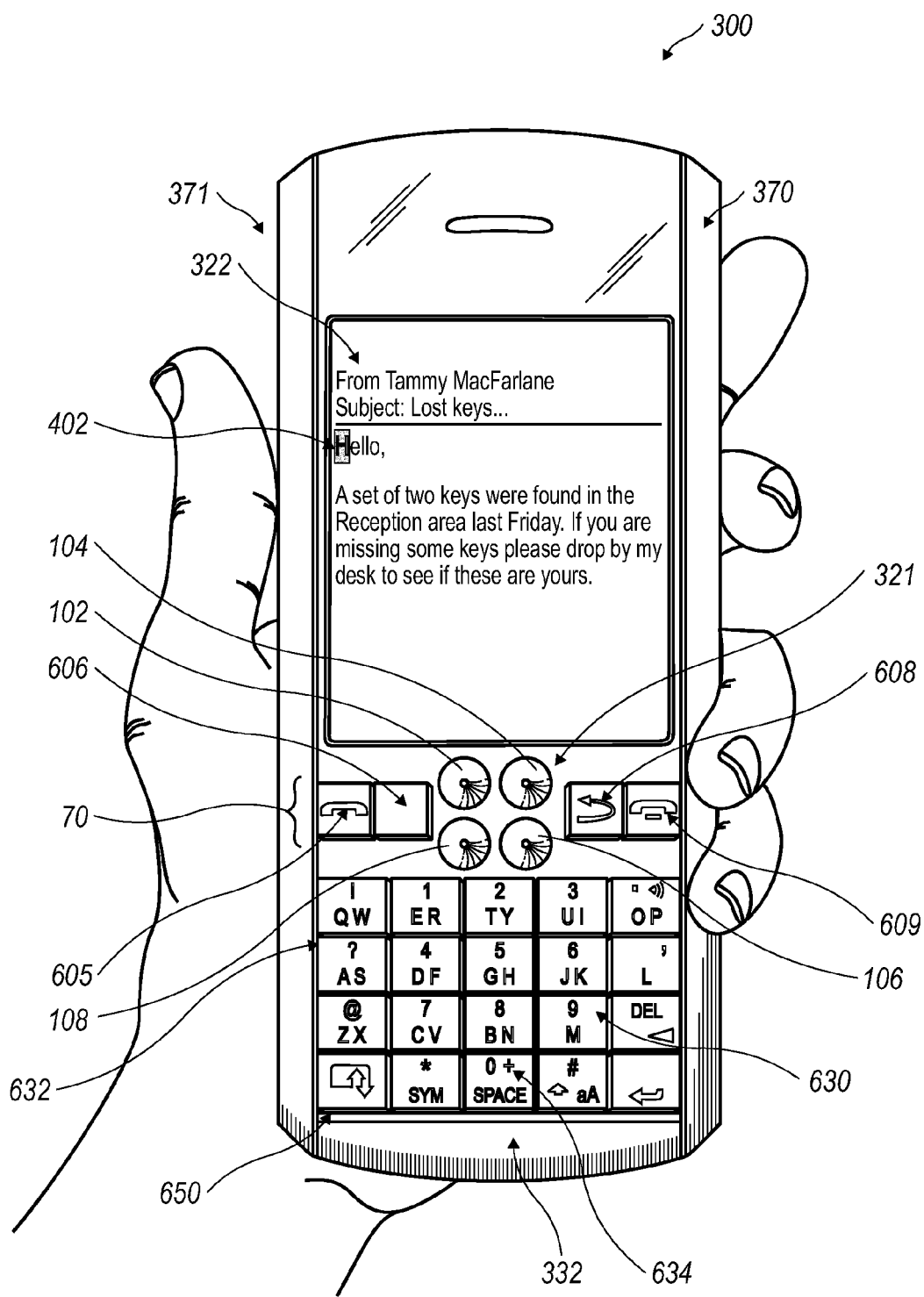
FIG. 1 illustrates a handheld communication device with a reduced keyboard configured according to the present teachings cradled in the palm of a user's hand.
Figure 2:
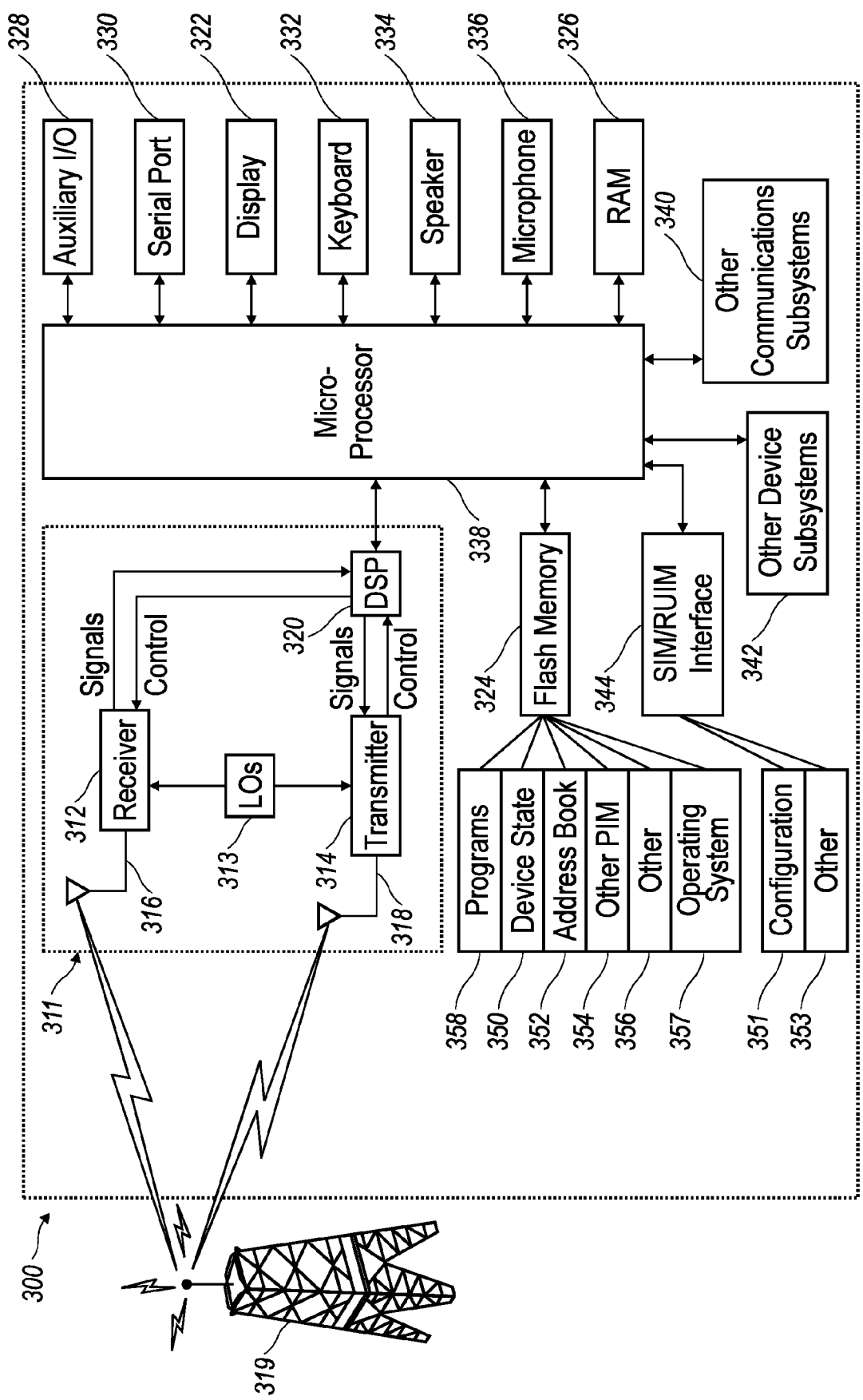
FIG. 2 is a block diagram representing a wireless handheld communication device interacting in a communication network.

An exemplary handheld electronic device 300 is shown in FIG. 1, and the device's cooperation in a wireless network 319 is exemplified in the block diagram of FIG. 2. These figures are exemplary only, and those persons skilled in the art will appreciate the additional elements and modifications necessary to make the device 300 work in particular network environments.

As shown in the block diagram of FIG. 2, the device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the communication device 300.

The auxiliary I/O subsystem 328 can take the form of a variety of different navigation tools (multi-directional or single-directional) such as a four-wheeled user input device 321 as illustrated in the exemplary embodiment shown in FIG. 1, or a thumbwheel, a navigation pad, a joystick, or the like. These navigation tools are preferably located on the front face 370 of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 constituting a user input and suitable for accommodating textual input to the handheld communication device 300. The front face 370 of the handheld device has a navigation row 70 and a key field 650 that includes alphanumeric keys 630, alphabetic keys 632, numeric keys 634, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld electronic device 300 preferably includes an auxiliary input that acts as a cursor navigational tool and which is also exteriorly located upon the front face 370 of the device 300. Its front face location is particularly advantageous because it makes the tool easily thumb-actuable like the keys of the keyboard. A particularly usable embodiment provides the navigational tool in the form of a four-wheeled user input device 321. The placement of the four-wheeled user input device 321 is preferably above the keyboard 332 and below the display screen 322; here, it avoids interference during keyboarding and does not block the user's view of the display screen 322 during use. (See FIG. 1).

As illustrated in FIG. 1, the present disclosure is directed to a handheld electronic communication device 300 configured to send and receive text messages. The handheld device 300 includes a hand cradleable body 371 configured to be held in one hand by an operator of the handheld device 300 during text entry. A display 322 is included that is located on a front face 370 of the body 371 and upon which information is displayed to the operator during text entry. A key field 650 is also located on the front face 370 of the body 371 and comprises a plurality of keys including a plurality of alphanumeric keys, symbol keys, and function keys. A navigation row 70 including menu keys 606, 608 and a four-wheeled user input device 321 is also located on the front face 370 of the body 371. The alphanumeric input keys 630 comprise a plurality of alphabetic keys 632 and numeric keys 634 having letters and numbers associated therewith. The order of the letters of the alphabetic keys 632 on the presently disclosed device can be described as being of a traditional, but non-ITU Standard E.161 layout. This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the four-wheeled user input device 321 serving as the principal navigation tool) at the outer ends of the navigation row 70. One of the two call keys is a call initiation key 605, and the other is a call termination key 609. The navigation row 70 also includes another pair of keys ("flanking keys") that are located immediately adjacent to the four-wheeled user input device 321, with one flanking key on either side of the four-wheeled user input device 321. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys, which include a menu call-up key 606 and an escape or back key 608. The menu key 606 is used to bring up a menu on the display screen 322 and the escape key 608 is used to return to the previous screen or previous menu selection. The functions of the call keys and the menu keys may, of course, be provided by buttons that are located elsewhere on the device, with different functions assigned to the outer keys and the flanking keys.

Furthermore, the device is equipped with components to enable operation of various programs, as shown in FIG. 2. In an exemplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one exemplary embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in the presently described exemplary embodiment is equipped with an integral or internal antenna 318 for transmitting signals to the communication network 319. Likewise the communication device 300 in the presently described exemplary embodiment is equipped with another antenna 316 for receiving communication from the communication network 319. These antennae (316, 318) in another exemplary embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in the presently described exemplary embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be effected using the thumb of the same hand in which the device 300 is held. However, it is appreciated that additional control can be effected by using both hands. The size of the handheld electronic communication device 300 must be kept commensurately small, in order to have a handheld electronic communication device that is easy to grasp and desirably pocketable. Of the device's dimensions, limiting its width is important for the purpose of assuring cradleability in a user's hand. Moreover, it is preferred that the width of the device 300 be maintained at less than eight centimeters (approximately three inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously elongated so that its height is greater than its width, but still remains easily supported and operated in one hand.

A potential drawback is presented by the small size of the device 300 in that there is limited exterior surface area for the inclusion of user input and device output features. This is especially true for the "prime real estate" on the front face 370 of the device 300, where it is most advantageous to include a display screen 322 that outputs information to the user. The display screen 322 is preferably located above a keyboard 332 that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the device 300, an alphabetic keyboard 332 is provided. In the exemplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the four-wheeled user input device 321. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 3A:
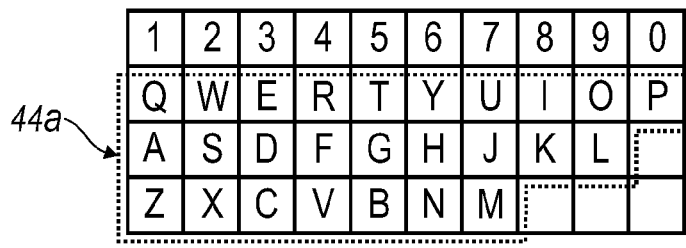
FIG. 3A illustrates an exemplary QWERTY keyboard layout.
Figure 3B:
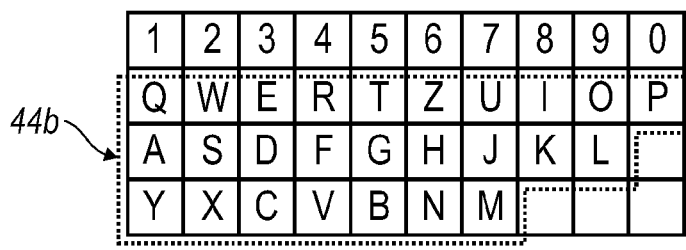
FIG. 3B illustrates an exemplary QWERTZ keyboard layout.
Figure 3C:
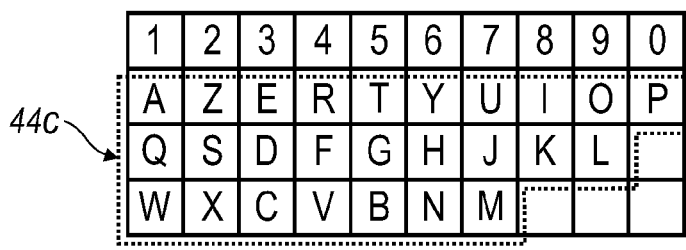
FIG. 3C illustrates an exemplary AZERTY keyboard layout.
Figure 3D:
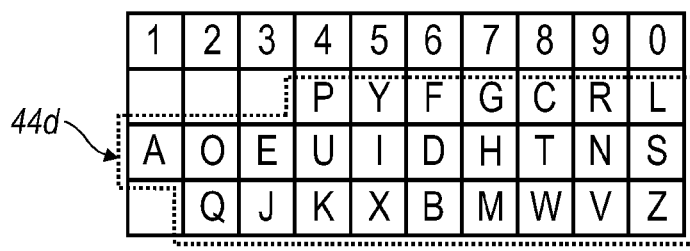
FIG. 3D illustrates an exemplary Dvorak keyboard layout.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3A. The QWERTZ keyboard layout is normally used in German-speaking regions; this alphabetic key arrangement 44b is shown in FIG. 3B. The AZERTY keyboard layout 44c is normally used in French-speaking regions and is shown in FIG. 3C. The Dvorak keyboard layout was designed to allow typists to type faster; this alphabetic key arrangement 44d is shown in FIG. 3D. In other exemplary embodiments, keyboards having multi-language key arrangements can be implemented.

Alphabetic key arrangements are often presented along with numeric key arrangements. Typically, the numbers 1-9 and 0 are positioned in the row above the alphabetic keys 44a-d, as shown in FIG. 3A-D. Alternatively, the numbers share keys with the alphabetic characters, such as the top row of the QWERTY keyboard. Yet another exemplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 9 and 10. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
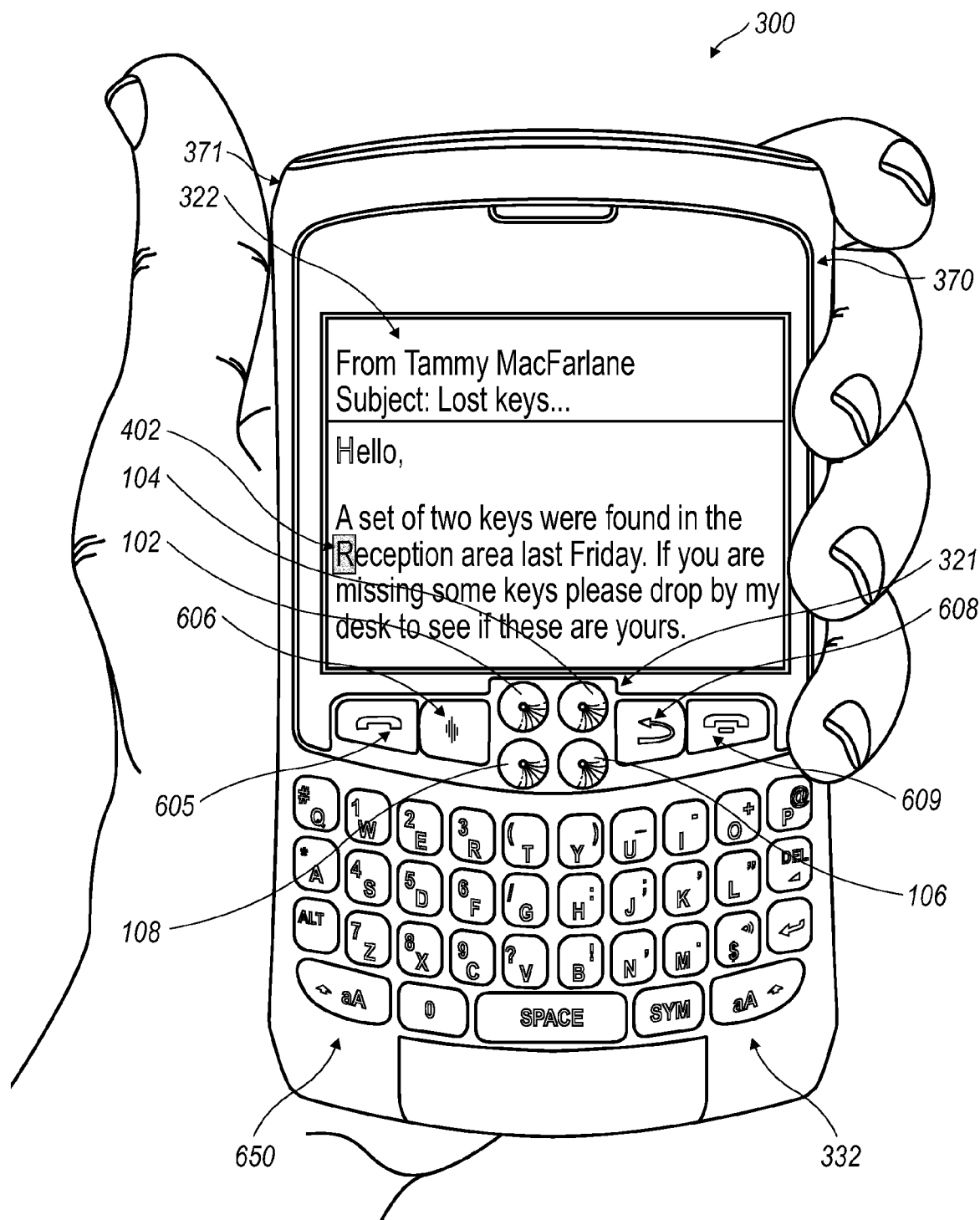
FIG. 7 illustrates a handheld electronic communication device configured with a full keyboard according to the present teachings cradled in the palm of a user's hand.

Reference is now made to FIG. 7, which discloses an exemplary embodiment having a full alphabetic keyboard arrangement. In particular, as shown in FIG. 7, only one letter of the alphabet is associated with any given alphabetic key within the keys of the key field 650. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. As shown in FIG. 9, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

The handheld electronic communication device 300 as disclosed herein includes a four-wheeled user input device 321 located on a front face 370 of the body 371 of the handheld electronic communication device 300. While the disclosed embodiments make use of four rotatable wheels, other embodiments include a pair of wheels, three wheels, or another plurality of wheels configured to produce output signals indicative of the cursor navigation as described herein. In one embodiment as illustrated in at least FIGS. 7 and 9C, the four-wheeled user input device 321 comprises a set of four rotatable wheels, each mounted on an axle 112 having a longitudinal axis oriented substantially perpendicular relative the front face 370 of the body 371. The axles 112 are arranged in a substantially square pattern in a plan view toward the front face 370 of the body 371. At least one sensor 110 is operatively associated with the set of four wheels. The at least one sensor 110 is configured to sense motion induced in any of the four wheels and the at least one sensor 110 is further configured to output electronic data representative of sensed wheel motion.

Figure 14:
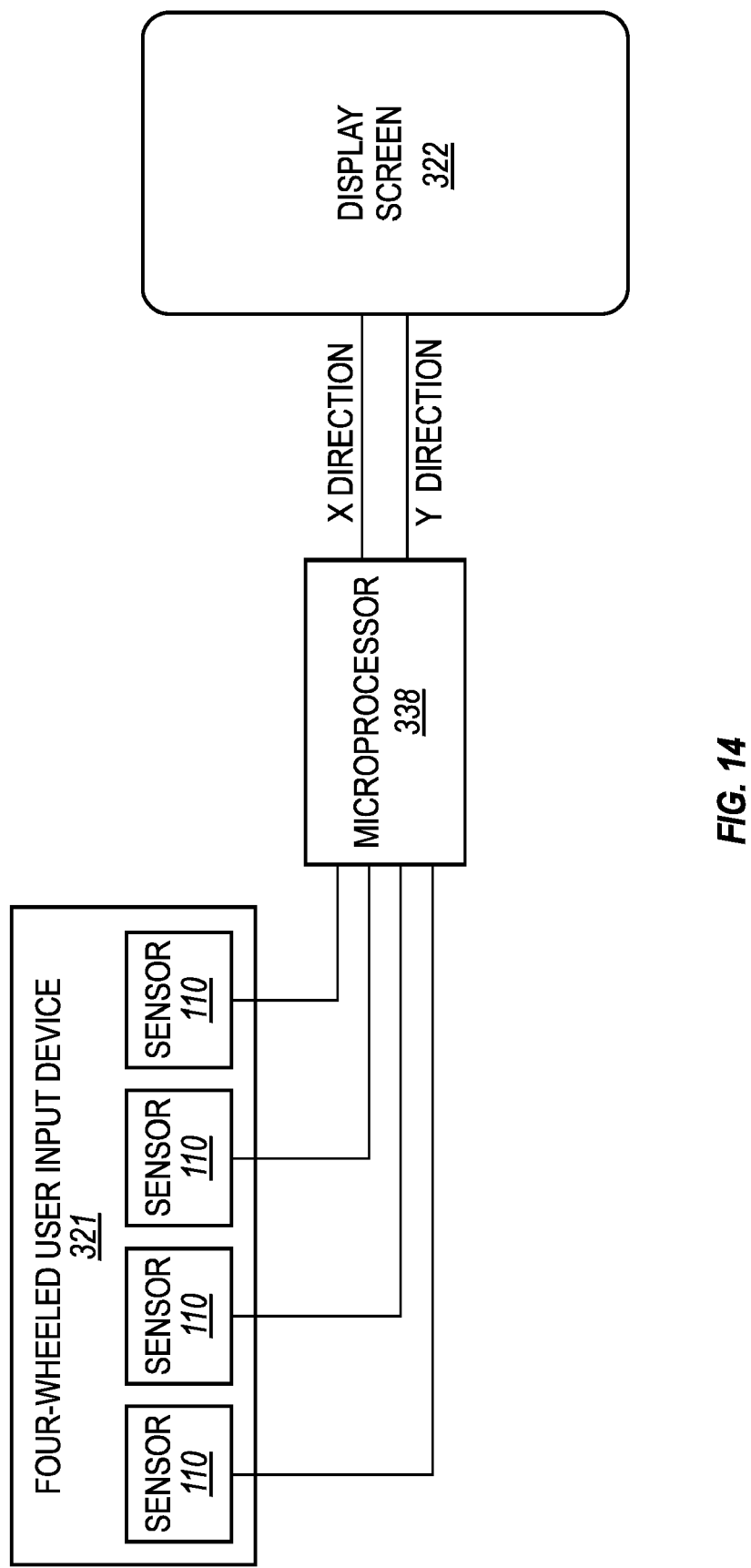
FIG. 14 is a block diagram of four-wheeled user input device, microprocessor and display screen.

The handheld electronic communication device 300 additionally includes a microprocessor 338 communicatively interposed between the at least one sensor 110 and the display screen 322. The microprocessor 338 is programmed to receive the output electronic data from the at least one sensor 110 as input data and to process the input data into cursor guidance instructions that are outputted to the display screen 322. The cursor guidance instructions affect at least one of x-direction and y-direction cursor movement on the display screen 322 in correspondence with the sensed wheel motion. In one embodiment as illustrated in FIG. 14, each of the rotatable wheels has a sensor 110 associated therewith and is communicatively associated with the microprocessor 338 which in turn is communicatively associated with the display screen 322.

This application generally describes the instructions to the display screen 322 in terms of x-direction and y-direction cursor movement on the display screen 322. The term cursor is used broadly in the sense that it could be instructing movement of the page shown on the display screen in addition to a cursor. It can also be understood that the cursor could take may different forms which could include a highlight cursor, underlining, or other way of signifying a portion of the display screen as selected. As illustrated a cursor 402 is shown on the display screens of FIGS. 1, 7 and 8. The movement of the cursor 402 can require instructing both x-direction and y-direction movement to change its position. Furthermore, diagonal movement may be desired in order to facilitate more rapid cursor movement or movement that is not in a substantially straight line. For instance, consider the cursor 402 shown on FIG. 7, if the user desires to move the cursor 402 from sitting over the "R" in "Reception" to the "t" in the word "to" in the last line, different directional commands may be input into the system. For instance, the user could request that the cursor 402 move down in the y-direction two lines followed by a request for the cursor 402 to move five characters to the right in the x-direction. Alternatively, the user might request two diagonal movements in which the cursor first proceeds to the "i" in "missing" and next to the "s" in "desk" followed by a request to move three characters to the right. Other navigational instructions are also contemplated herein.

Figure 8:
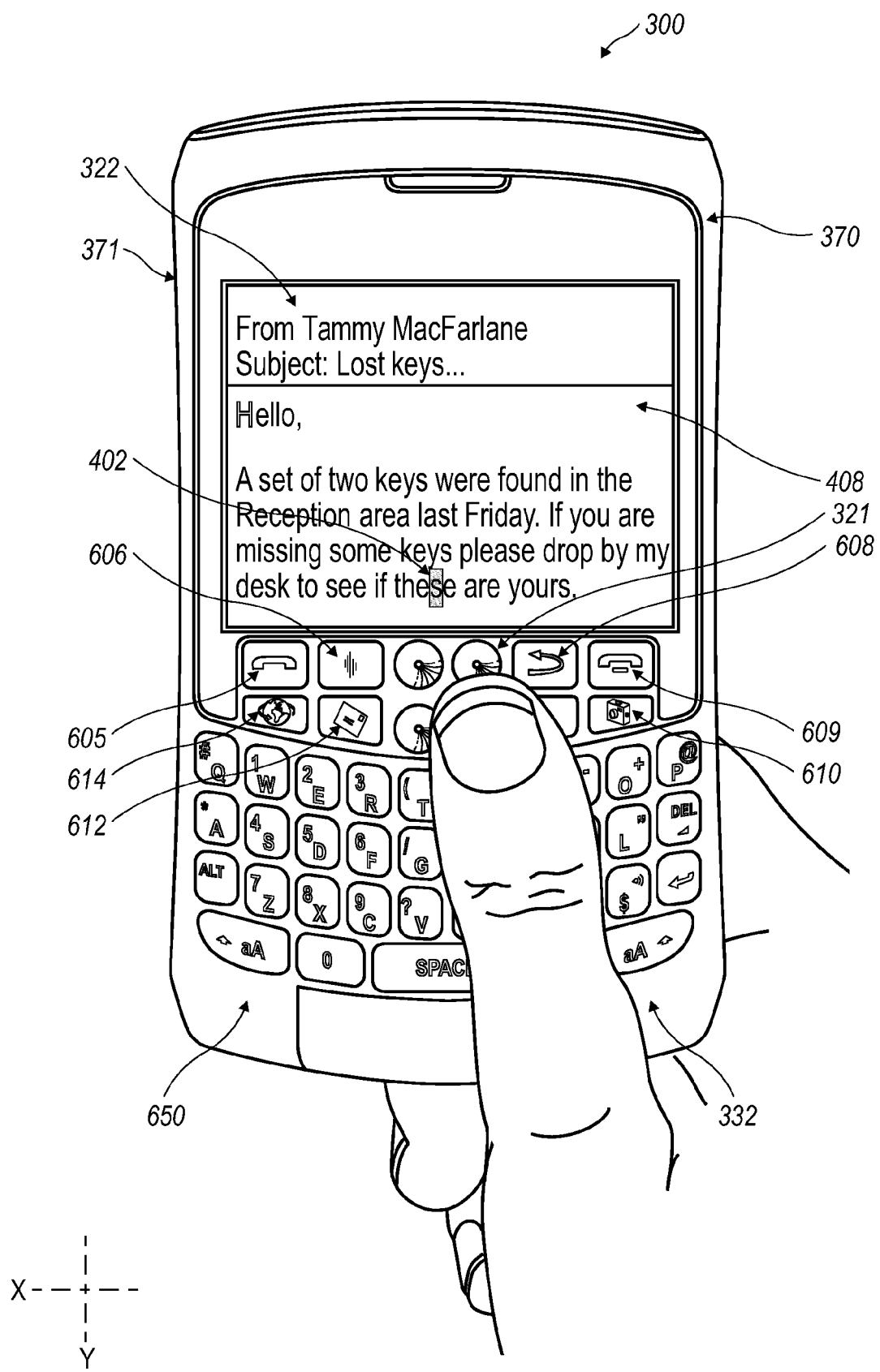
FIG. 8 illustrates an alternate embodiment of a handheld electronic communication device configured with a full keyboard according to the present teachings where the thumb of the user is activating the wheeled user input device.

As illustrated in FIG. 1, the four-wheeled user input device 321 has the axle 112 of each wheel arranged in a substantially square pattern. In the plan view toward the front face 370 of the body 371, an upper-left wheel 102, an upper-right wheel 104, a lower-left wheel 106 and a lower-right wheel 108 are shown. The axles 112 of the wheels are located substantially at the center points of the wheels as illustrated in FIG. 1. Further illustration of the axle 112 and suspension is given in relation to FIG. 9C below. Alternative embodiments of the handheld electronic communication device 300 are further illustrated with respect to FIGS. 7 and 8. In FIG. 7, a handheld electronic device 300 configured similarly to that of FIG. 1 is illustrated with a full keyboard instead of a reduced keyboard of FIG. 1. Additionally, the dimensions of the handheld electronic communication device 300 illustrated in FIG. 7 is slightly wider as compared with the device of FIG. 1. Another embodiment of the handheld electronic communication device 300 is illustrated in FIG. 8. In this embodiment, additional keys have been added to the area surrounding the wheeled user input device 321. In addition to the call key 605, menu key 606, escape key 608, and end key 609, other dedicated keys have been added. These other dedicated keys can control an additional function of the handheld electronic device such as those illustrated where a camera key 610, an email key 612, and internet key 614 have been added. Additionally, the handheld electronic communication device 300 shown in FIG. 8 illustrates the actuation of the wheeled user input device 321 by the thumb of the hand of a user holding the handheld electronic communication device 300. The arrangement of the handheld electronic communication device 300 lends itself to either single or double hand cradling.

Figure 9A:
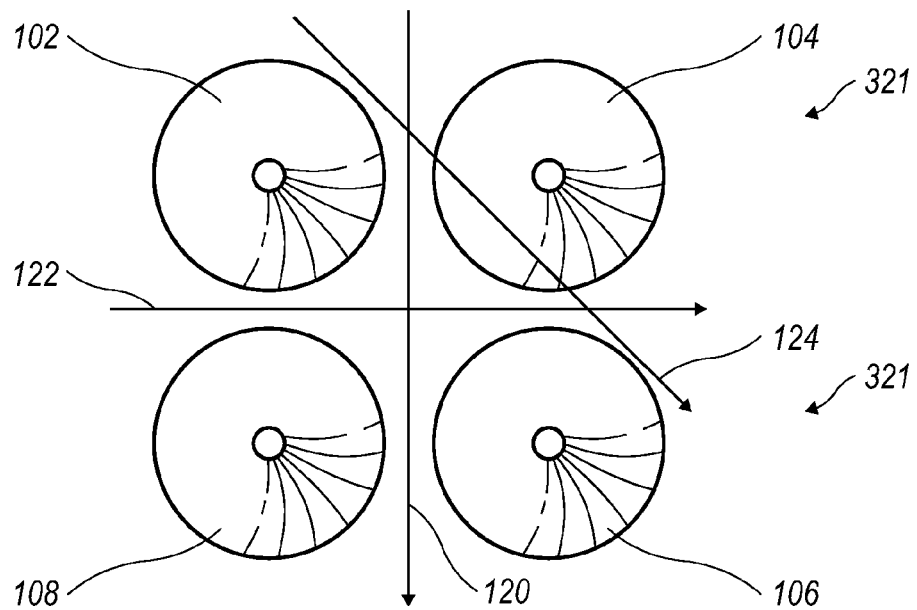
FIG. 9A illustrates a four-wheeled user input device with directional arrows showing possible user activation of the wheeled user input device.
Figure 9B:
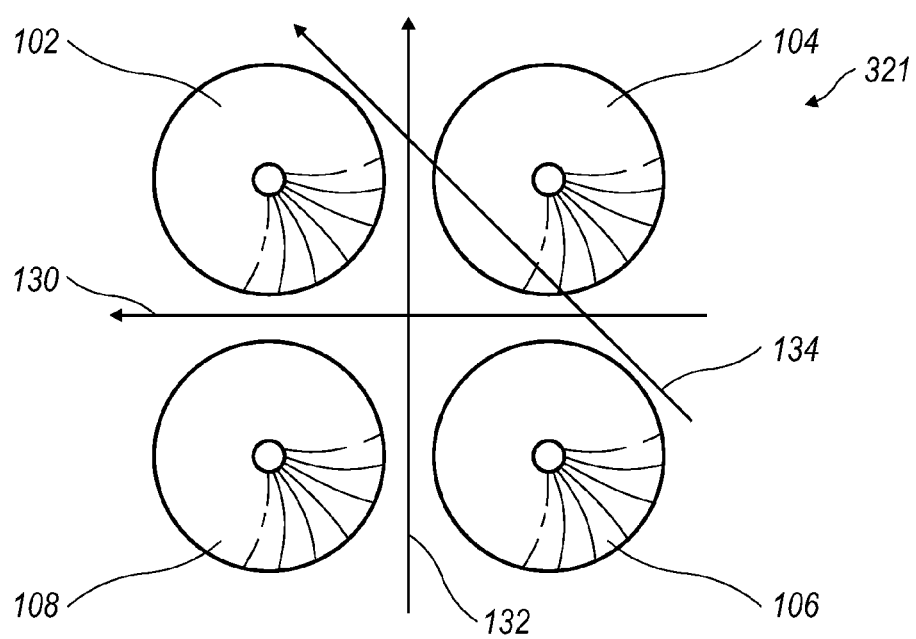
FIG. 9B illustrates a four-wheeled user input device with alternate directional arrows, as compared with FIG. 9A, showing possible user activation of the wheeled user input device.

Now turning to FIGS. 9A and 9B, the programming associated with particular user activation of the wheels is explained in detail. In at least one embodiment, the microprocessor 338 is further programmed to instruct y-direction cursor movement on the display screen 322 when simultaneous opposite direction rotation of the upper left wheel 102 and the upper-right wheel 104 is sensed. Y-direction cursor movement on the display screen 322 can be best understood by referring to the directional axes indicated on lower right FIGS. 1, 7 and 8. In at least one example the microprocessor 338 is further programmed to instruct y-direction cursor movement on the display screen 322 when substantially simultaneous clockwise direction rotation of the upper-left wheel 102 is sensed and counterclockwise direction rotation of the upper-right wheel 104 is sensed. In this disclosure the use of the directional rotation is described as clockwise and counterclockwise, these directions can be best understood when viewing the front face 370 of the handheld electronic communication device 300. In yet another embodiment, the microprocessor 338 is further programmed to instruct y-direction cursor movement on the display screen when simultaneous opposite direction rotation of the lower-left wheel 108 and the lower-right wheel 106 is sensed. In at least one embodiment, the microprocessor is further programmed to instruct y-direction cursor movement on the display screen 322 when substantially simultaneous clockwise direction rotation of the lower-left wheel 108 is sensed and counterclockwise direction rotation of the lower-right wheel 106 is sensed.

Further illustration of at least one of the embodiments can be described in relation to the direction of travel of the user engagement of the wheels. In this situation, the user actuates the wheels by a downward stroke (arrow 120) through the center of the four wheels of the wheeled user input device 321. In this situation the two wheels opposite one another have opposite rotations, namely the left hand side wheels 102, 108 have a clockwise rotation while the wheels on the right 104, 106 have a counterclockwise rotation. When the microprocessor 338 receives signals indicative of the above described rotation, it can be programmed to instruct downward y-direction cursor movement on the display screen 322.

If instead the user actuates the wheels with a substantially upward stroke (arrow 132) as illustrated in FIG. 9B, the wheels have rotation that is opposite as that described in relation to the downward stroke (arrow 120). In this situation, the left hand wheels 102, 108 move in a substantially counterclockwise rotation and the right hand wheels 104, 106 move in substantially a clockwise rotation. When the microprocessor 338 receives signals indicative of the above described rotation, it can be programmed to instruct upward y-direction cursor movement on the display screen 322.

In at least one embodiment, the microprocessor 338 is further programmed to instruct x-direction cursor movement on the display screen 322 when simultaneous opposite direction rotation of the upper-left wheel 102 and the lower-left wheel 108 is sensed. X-direction cursor movement on the display screen can be best understood by referring to the directional axes indicated on lower right FIGS. 1, 7 and 8. In at least one example the microprocessor is further programmed to instruct x-direction cursor movement on the display screen 322 when substantially simultaneous counterclockwise direction rotation of the upper-left wheel 102 is sensed and clockwise direction rotation of the lower-left wheel 108 is sensed. In yet another embodiment, the microprocessor is further programmed to instruct x-direction cursor movement on the display screen when simultaneous opposite direction rotation of the upper-right wheel 104 and the lower-right wheel 106 is sensed. In at least one embodiment, the microprocessor is further programmed to instruct x-direction cursor movement on the display screen 322 when substantially simultaneous counterclockwise direction rotation of the upper-right wheel 104 is sensed and clockwise direction rotation of the lower-right wheel 106 is sensed.

Further illustration of at least one of the embodiments can be described in relation to the direction of travel of the user engagement of the wheels. In this situation, the user actuates the wheels by a rightward stroke (arrow 122) through the center of the four wheels of the wheeled user input device 321. In this situation the two wheels opposite one another have opposite rotations, namely the upper wheels 102, 104 have a counterclockwise rotation while the lower wheels 106, 108 have a clockwise rotation. When the microprocessor 338 receives signals indicative of the above described rotation, it can be programmed to instruct rightward x-direction cursor movement on the screen.

If instead the user actuates the wheels with a substantially leftward stroke (arrow 130) as illustrated in FIG. 9B, the wheels have rotation that is opposite as that described in relation to the rightward stroke (arrow 122). In this situation, the upper wheels 102, 104 move in a substantially clockwise rotation and the lower wheels 106, 108 move in substantially a counterclockwise rotation. When the microprocessor 338 receives signals indicative of the above described rotation, it can be programmed to instruct leftward x-direction cursor movement on the display screen 322.

While particular examples have been described above as causing upward, downward, leftward, and rightward movement, it is possible that the movement may be designed to occur in the opposite direction. Additionally, it may be desirable to allow the user to direct cursor movement in diagonal or other directions besides just the x and y direction. In at least one embodiment, the microprocessor 338 is further programmed to instruct diagonal cursor movement on the display screen 322 when a first direction rotation is sensed in a first wheel, an opposite direction rotation is subsequently sensed in a wheel positioned adjacent to the first wheel and then a first direction rotation is thereafter sensed in the wheel positioned catercorner to the first wheel.

This can be further understood in relation to the illustrated embodiments of FIGS. 9A and 9B. In FIG. 9A, a diagonal user activation (illustrated by arrow 124) results in the upper-left wheel 102 rotating in a first direction (clockwise) and then the activation rotates the upper-right wheel 104 in a second direction (counterclockwise) and further the activation rotates the lower-right wheel 106 in the first direction (clockwise). In FIG. 9B, a diagonal user activation (illustrated by arrow 134) results in the lower-right wheel 106 rotating in a first direction (counterclockwise) and then the activation rotates the upper-right wheel 104 in a second direction (clockwise) and further the activation rotates the upper-left wheel in the first direction (counterclockwise).

While the above described diagonal movement has been described in relation to three wheels, it is possible to determine if diagonal movement is desired based upon activation of four wheels. For instance if the user had moved in a diagonal fashion across the peaks of upper-left wheel 102 and lower-right wheel 106, the upper-right wheel 104 and lower-left wheel 108 would rotate in an opposite direction. In the example where the user first touched the upper-right wheel 102 followed by the lower-left wheel 106, the upper-right wheel would turn in counterclockwise rotation and the lower-left wheel 108 would rotate in a clockwise direction. These examples of diagonal movement are not exhaustive, as pairings of different wheels and their rotations could be made in order to determine diagonal movement. For instance if diagonal line 134 is mirror about the origin it would require activation of the lower-right wheel 106, the lower-left wheel 108, and upper-left wheel 102. In this situation, the lower, right wheel would rotate in a clockwise direction and the lower left-wheel 108 would rotate in a counterclockwise direction and the upper-left wheel would rotate in a clockwise direction. Other similar rotations would be appreciated by one skilled in the art.

Figure 9C:
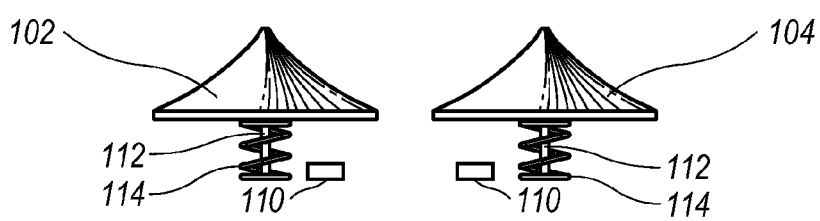
FIG. 9C illustrates the axles of a pair of wheels of the wheeled user input device with individual depressibly actuable platforms.

In order to provide further increased functionality, it would be possible to configure the wheels for depressible activation either independently or as whole. Two examples are provided in FIGS. 9C and 13. In FIG. 9C, it can be understood that at least one of the four rotatable wheels could be depressibly actuable for initiating execution of a corresponding programmed application on the handheld electronic communication device. In illustrated embodiment, the upper-left wheel 102 and upper-right wheel 104 are illustrated. As illustrated each of the wheels 102, 104 has an axle 112 that is aligned substantially along the axis running substantially perpendicular to the wheel and through approximately the center point of the wheels 102, 104. The axle 112 allows the wheels to rotate freely. Furthermore, a spring member 114 is provided to allow each of the wheels to be independently depressible. A sensor 110 can be used to measure the rotation of the wheels 102, 104. Furthermore, this same sensor 110 or an additional sensor (not shown) could be used to detect the depression of the wheels 102, 104. While the illustrated embodiments have a spring shown for the allowing a respective wheel to be depressible, it is contemplated that other technology could be implemented including domed switches and other resilient members to accommodate the depression of the wheel.

Figure 10A:
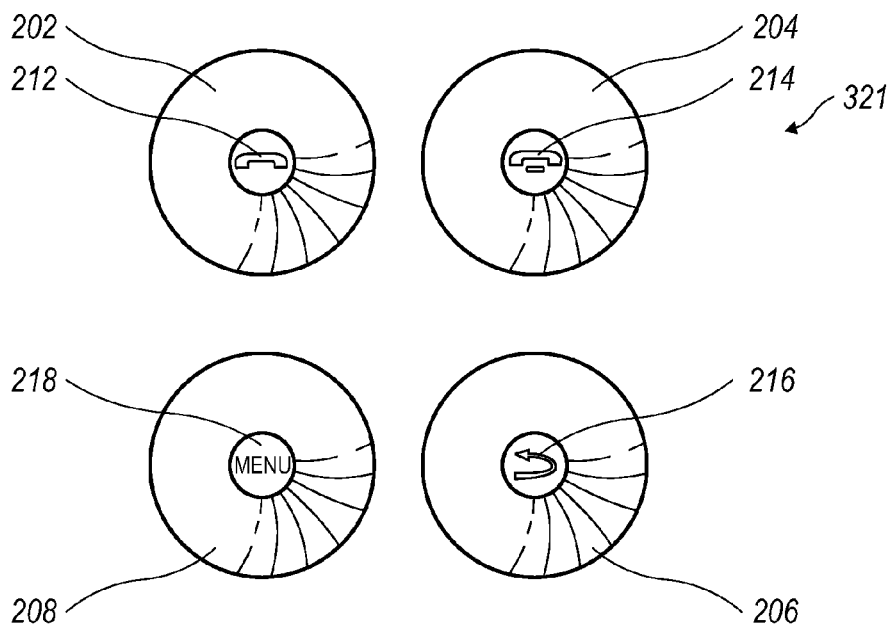
FIG. 10A illustrates an alternative embodiment of the wheeled user input device with non-rotatable axles.
Figure 11:
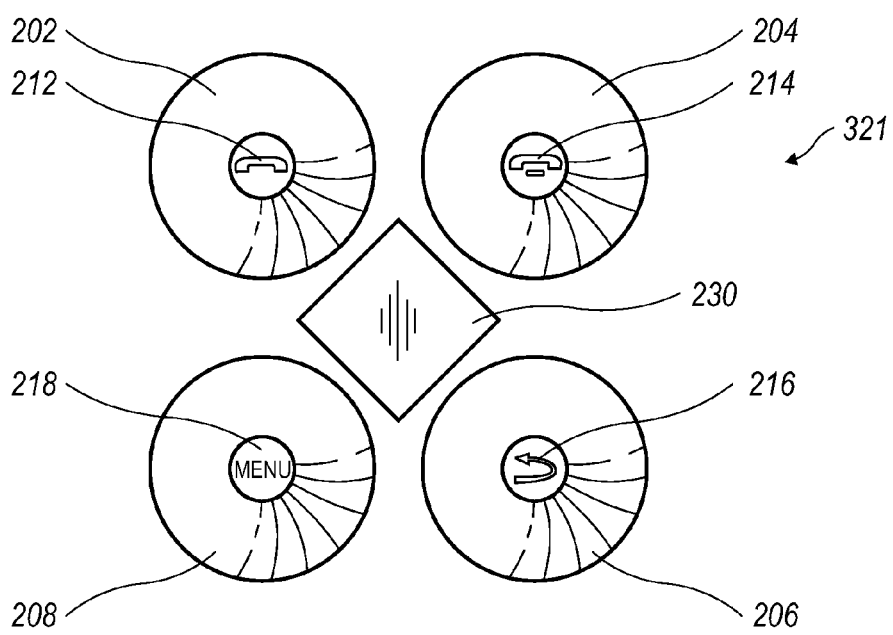
FIG. 11 illustrates yet another embodiment of the wheeled user input device including a center actuation button.

While in some situations it might be desirable to have only one of the wheels to be depressible, in other embodiments more than one wheel could be depressible. In at least one embodiment, each of the four rotatable wheels is depressibly actuable for initiating execution of a respectively corresponding programmed application on the handheld electronic communication device. In order to aid the user in understanding which application or function is executed upon depression of the wheel it, the respective wheels can be labeled with corresponding indicia associated with that particular function. The entire wheel may be labeled (not shown) or a center portion of the wheel could be labeled as illustrated in FIGS. 10A and 11. Furthermore, the area adjacent to the wheels could be labeled instead with the functions to be associated with the depression of each of the wheels instead of the wheel itself being labeled. This may also be used where a key combination could be implemented to allow the wheels to bring up alternate functions.

Figure 13:
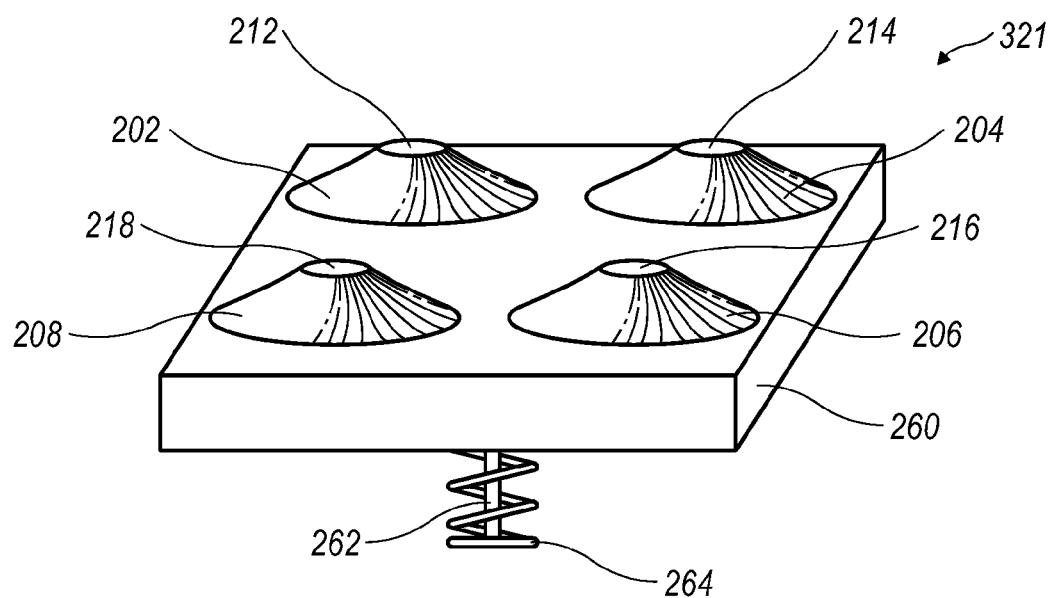
FIG. 13 illustrates another embodiment of the wheeled user input device mounted on a depressible actuable platform.

In at least one embodiment the four-wheeled user input device is mounted atop a depressibly actuable platform. At least one example of this embodiment is illustrated in FIG. 13. In this situation the upper-left wheel 202, upper-right wheel 204, lower-right wheel 206, and lower-left wheel 208 are mounted atop a platform 260. The platform is mounted on a suspension member consisting of an actuator 262 and spring 264. This suspension member is provided for exemplary purposes and a domed switch or the like could be substituted instead.

Figure 10B:
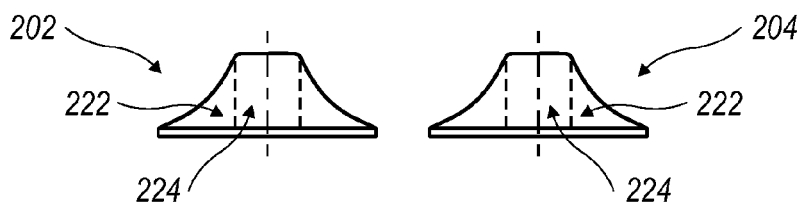
FIG. 10B illustrates an elevation view of two wheels of the wheeled user input device of FIG. 10A.

In yet another embodiment, as illustrated in at least FIGS. 10A, 10B and 11, the four rotatable wheels is rotatably mounted upon a respective non-rotatable axle. As illustrated in FIG. 10B, the non-rotatable axle 224 is substantially centered within the wheel 202, 204. The wheels illustrated are the upper-left wheel 202 and upper-right wheel 204. The outer portion of the wheel 222 rotates about the center axle 224. Additionally, in this configuration it is possible to have a portion of the wheel be flattened. The upper portion of the axle 224 can be exposed with a device function indicia associated there with. In one embodiment, at least one of the non-rotatable axles 224 has top end marked with indicia for a telephone call initiation. For instance, the upper portion 212 of the upper-left wheel 202 is marked with indicia for telephone call initiation. In yet another embodiment, at least one of the non-rotatable axles 224 has a top end marked for telephone call end. For instance, the upper portion 214 of the upper-right wheel 204 is marked with indicia for telephone call end. In yet another embodiment, at least one of the non-rotatable axles 224 has a top end marked with indicia for menu display. For instance, the upper portion 218 of the lower-left wheel 208 is marked with indicia for menu display. In yet another embodiment, at least one of the non-rotatable axles 224 has a top end marked with indicia for an escape or back function. For instance, the upper portion 216 of the lower-right wheel 206 is marked with indicia for an escape or back function.

Additionally, other functionality may be implemented using the space between the wheels to accommodate an additional button. The programmable button 230 shown in FIG. 11 can be user programmed or preset.

Figure 12:
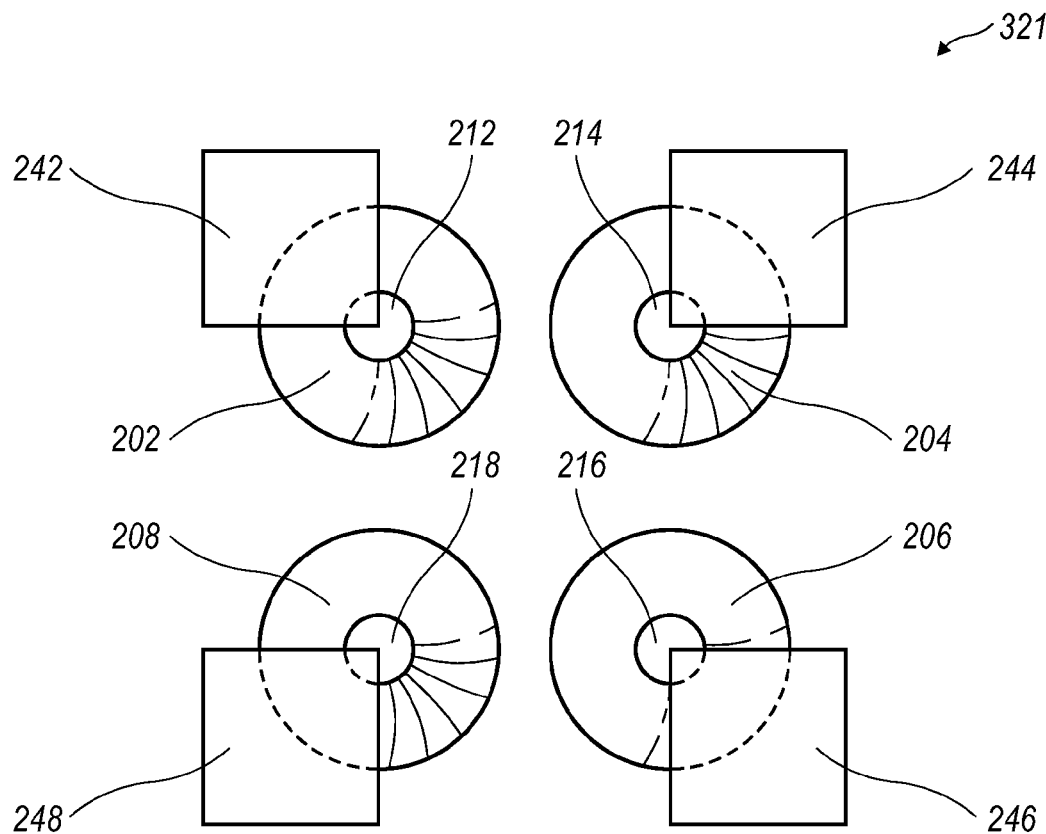
FIG. 12 illustrates still another embodiment of the wheeled user input device having a portion of the wheels concealed from the user.

In at least one embodiment as illustrated in FIG. 12, it may be desirable to limit the ways in which a user may engage the four wheels. As illustrated the upper-left wheel 202 is partially concealed by an upper-left block 242. Likewise, the upper-right wheel 204 is partially concealed by an upper-right block 244; lower-right wheel 206 is partially concealed by a lower-right block 246; lower-left wheel 208 is partially concealed by a lower-left block 248. Other arrangements which conceal a portion of the wheels may also be implemented according to this disclosure. In concealing a portion of the wheel, the user is constrained from activating certain portions of the wheels. In the illustrated embodiment, the configuration allows for essentially an up, down, left and right motion to be implemented by the user. This aids the microprocessor 338 in understanding which wheels could be activated and increases the likelihood of implementing the correct cursor navigation instruction to be issued to the display screen.

Figure 16A:
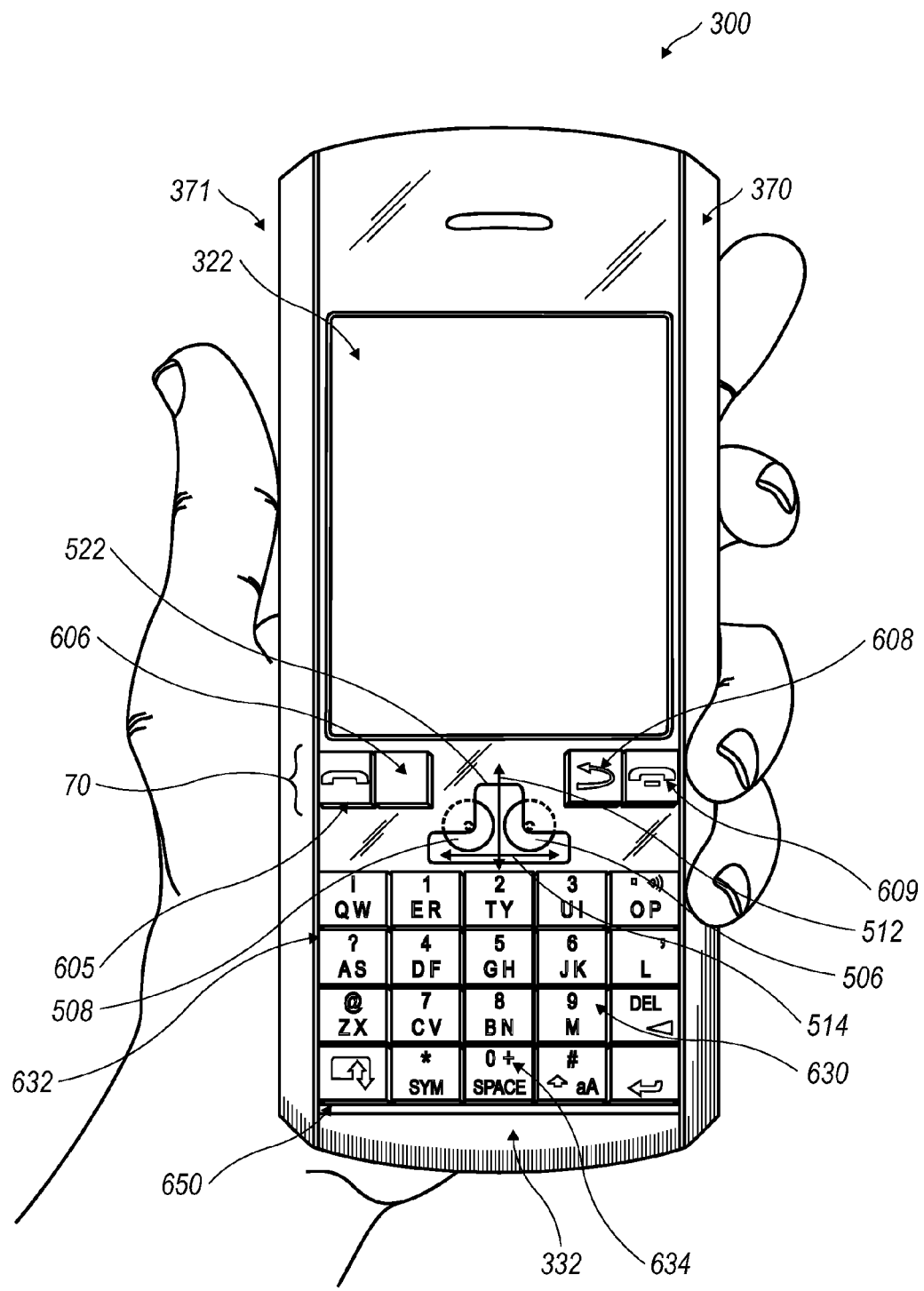
FIG. 16A is a handheld electronic communication device having an alternative embodiment of the user input device according to the present teachings.
Figure 16B:
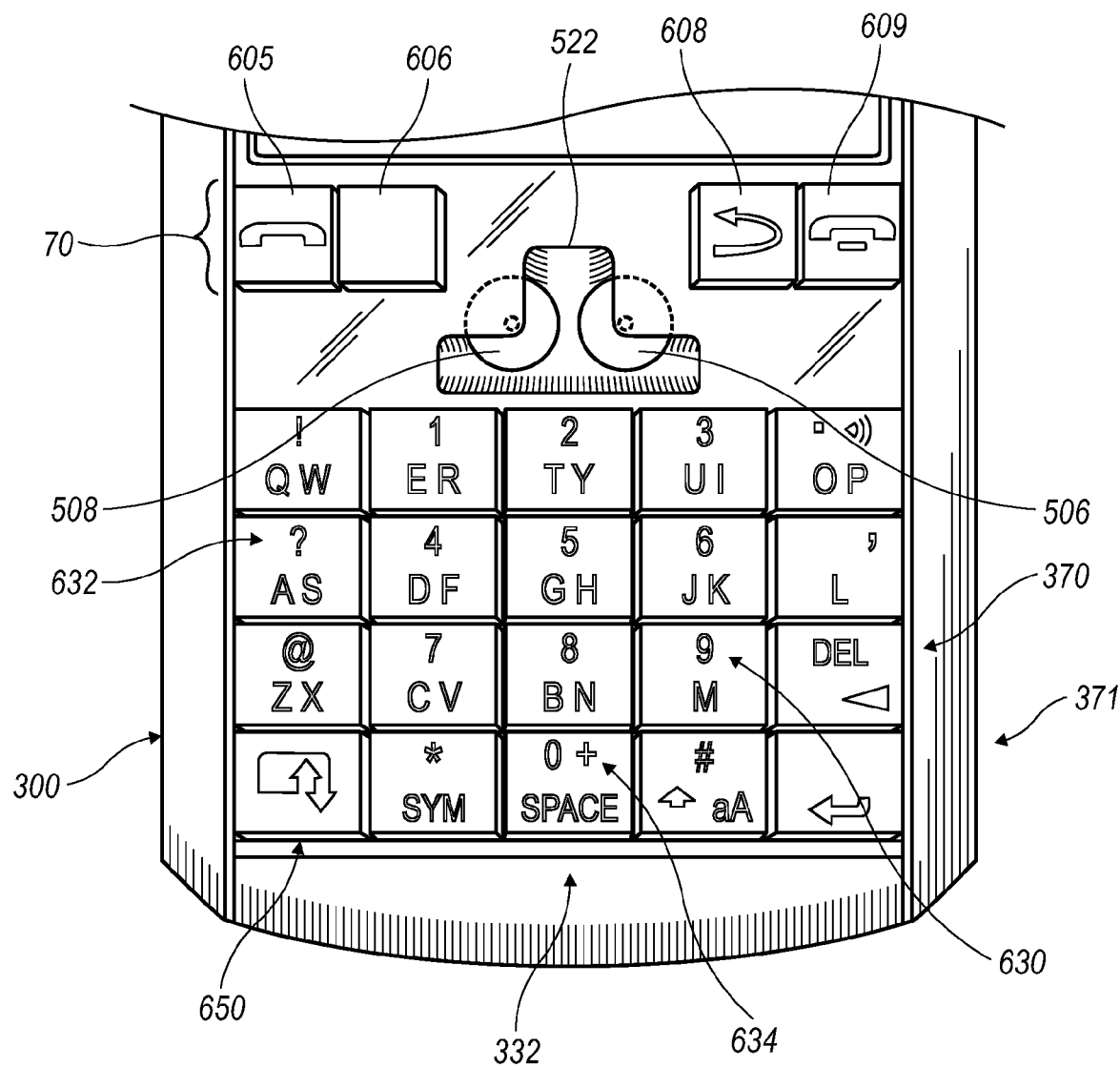
FIG. 16B is close-up view of the keyboard and user input device illustrated in 16A.

In another arrangement for distinguishing user desired cursor movement is illustrated in FIGS. 16A and 16B. As illustrated, the particular path of activation of the wheels may be restrained. As illustrated, a right wheel 506 and a left wheel 508 are provided on the front face 370 of the handheld electronic communication device 300. Additionally a path 522 is provided on the front face 370 of the handheld electronic communication device 300. This path 522 can be recessed on the front face 370 of the device 300. As illustrated, the path is concave groove in the front face 370 of the handheld electronic communication device 300. This can be achieved by molding or other processing of the body 371 of the handheld electronic communication device 300. The right wheel 506 and left wheel 508 can be situated such that in order for an operator of the handheld electronic device 300 to activate the wheels 506, 508 the operator's finger, thumb or means of activation must traverse the path 522 in a direction indicated by arrows 512, 514. The restriction on the motion of the operator's finger by the path 522 allows for the sensors to determine what direction the operator is desiring to input into the handheld electronic communication device 300. When the operator moves a finger through the vertical path in an upward direction the right wheel 506 rotates clockwise and the left wheel 508 rotates counterclockwise. If the operator wishes to instruct downward cursor navigation, the operator strokes the finger downward through the vertical path and the right wheel 506 rotates counter-clockwise and the left wheel 508 rotates clockwise. Similarly, if the operator wishes to instruct rightward cursor movement, the operator moves a finger through the horizontal path to the right and both the right wheel 506 and left wheel 508 rotate counter-clockwise. When the operator wishes to instruct leftward direction, the operator moves a finger through the horizontal path in a leftward direction and the right wheel 506 and left wheel 508 rotate clockwise.

Figure 15:
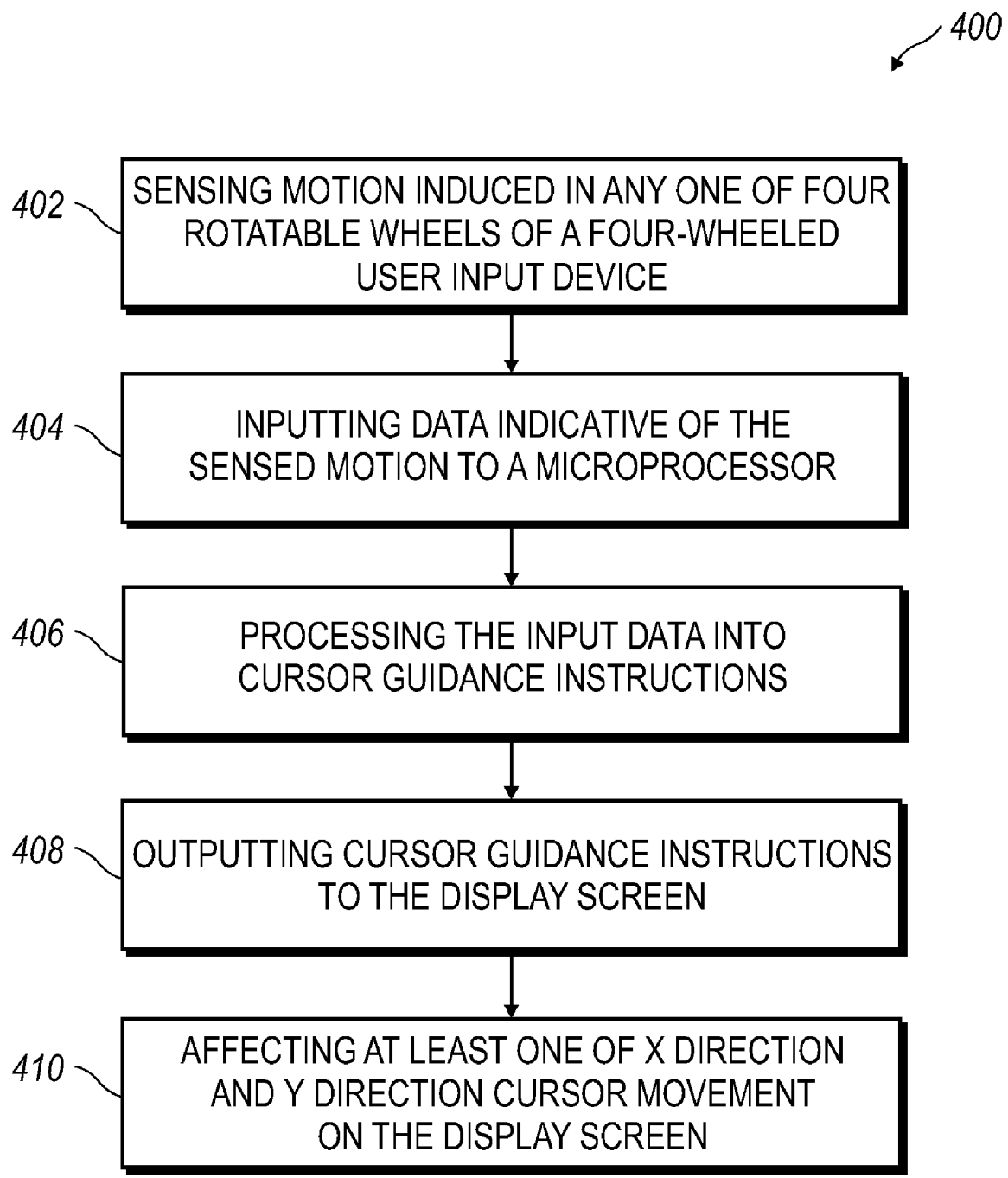
FIG. 15 is a flow chart illustrating an exemplary method for cursor navigation on a display screen of a handheld electronic communication device.

In at least one embodiment, a method 400 for executing cursor navigation on a display screen is disclosed. An illustrative embodiment of the method is shown in FIG. 15. The method senses, via at least one sensor, motion induced in any one of four rotatable wheels of a four-wheeled user input device located on a front face of the body (block 402). Each of the four rotatable wheels can be mounted on respective axle having a longitudinal axis oriented substantially perpendicular relative the front face of the body as described above. Additionally, the axles can be arranged in a substantially square pattern in a plan view toward the front face of the body. The body can further comprise a display screen located above the four-wheeled user input device. The method further includes inputting data indicative of the sensed motion to a microprocessor communicatively interposed between the at least one sensor and the display screen (block 404). The microprocessor can be programmed to receive cursor guidance instructions via the sensor and to cause corresponding cursor movement on the display screen. Additionally, the method includes processing the input data into cursor guidance instructions that are outputted to the display screen (block 408). The method affects at least one of x-direction and y-direction cursor movement on the display screen in correspondence with the sensed wheel motion (block 410). Furthermore, the method may incorporate the above described sensing of the rotation of a particular wheel or a particular set of wheels to direct cursor movement according to the above described motions of the wheels either in x-direction, y-direction or diagonal movement.

Additionally, a computer program for executing cursor navigation on a handheld electronic communication device is disclosed. The program is configured to run on a microprocessor in the handheld electronic communication device and programmed to receive data from at least one sensor indicative of sensed motion induced in any one of four rotatable wheels of the four wheeled user input device. The four-wheeled user input device can be located on the front face of the body, as described above. Each of the four rotatable wheels can be mounted on a respective axle having a longitudinal axis oriented substantially perpendicular relative the front face of the body. The axles being arranged in a substantially square patter in a plan view toward the front face of the body. The body can further comprise a display screen located above the four-wheeled user input device. The microprocessor is communicatively interposed between the at least one sensor and the display screen, as illustrated in FIG. 14. The program can be further programmed to cause at least one of x-direction and y-direction cursor movement on the display screen in correspondence with the sensed wheel motion. Furthermore, the program may incorporate the above described sensing of the rotation of a particular wheel or a particular set of wheels to direct cursor movement according to the above described motions of the wheels either in x-direction, y-direction or diagonal movement.

Exemplary embodiments have been described hereinabove regarding both handheld wireless communication devices 300, as well as the communication networks 319 within which they operate. Again, it should be appreciated that the focus of the present disclosure is providing a user input device for cursor navigation on a handheld electronic communication device. Various modifications to and departures from the disclosed embodiments will occur to those having skill in the art. The subject matter that is intended to be within the spirit of this disclosure is set forth in the following claims.

What is claimed is:

1. A handheld electronic communication device, comprising:
   a device body having a display screen located above a four-wheeled user input device located on a front face of the body, said four-wheeled user input device comprising a set of four rotatable wheels, each mounted on an axle having a longitudinal axis oriented substantially perpendicular relative the front face of the body and said axles being arranged in a substantially square pattern in a plan view toward the front face of the body;
   at least one sensor operatively associated with the set of four wheels, said at least one sensor configured to sense motion induced in any of said four wheels and said at least one sensor further configured to output electronic data representative of sensed wheel motion; and
   a microprocessor communicatively interposed between the at least one sensor and the display screen and programmed to receive the output electronic data from the at least one sensor as input data and to process said input data into cursor guidance instructions that are outputted to the display screen and which affect at least one of x-direction and y-direction cursor movement on the display screen in correspondence with the sensed wheel motion.

2. The handheld electronic communication device as recited in claim 1, wherein the substantially square pattern arrangement of the axles defines, in the plan view toward the front face of the body, an upper-left wheel, an upper-right wheel, a lower-left wheel and a lower-right wheel.

3. The handheld electronic communication device as recited in claim 2, wherein said microprocessor is further programmed to instruct y-direction cursor movement on the display screen when substantially simultaneous opposite direction rotation of the upper-left wheel and the upper-right wheel is sensed.

4. The handheld electronic communication device as recited in claim 2, wherein said microprocessor is further programmed to instruct y-direction cursor movement on the display screen when substantially simultaneous clockwise direction rotation of the upper-left wheel is sensed and counterclockwise direction rotation of the upper-right wheel is sensed.

5. The handheld electronic communication device as recited in claim 2, wherein said microprocessor is further programmed to instruct y-direction cursor movement on the display screen when substantially simultaneous opposite direction rotation of the lower-left wheel and the lower-right wheel is sensed.

6. The handheld electronic communication device as recited in claim 2, wherein said microprocessor is further programmed to instruct y-direction cursor movement on the display screen when substantially simultaneous clockwise direction rotation of the lower-left wheel is sensed and counterclockwise direction rotation of the lower-right wheel is sensed.

7. The handheld electronic communication device as recited in claim 2, wherein said microprocessor is further programmed to instruct x-direction cursor movement on the display screen when substantially simultaneous opposite direction rotation of the upper-left wheel and the lower-left wheel is sensed.

8. The handheld electronic communication device as recited in claim 2, wherein said microprocessor is further programmed to instruct x-direction cursor movement on the display screen when substantially simultaneous counterclockwise direction rotation of the upper-left wheel is sensed and clockwise direction rotation of the lower-left wheel is sensed.

9. The handheld electronic communication device as recited in claim 2, wherein said microprocessor is further programmed to instruct x-direction cursor movement on the display screen when substantially simultaneous opposite direction rotation of the upper-right wheel and the lower-right wheel is sensed.

10. The handheld electronic communication device as recited in claim 2, wherein said microprocessor is further programmed to instruct x-direction cursor movement on the display screen when substantially simultaneous counter-clockwise direction rotation of the upper-right wheel is sensed and clockwise direction rotation of the lower-right wheel is sensed.

11. The handheld electronic communication device as recited in claim 2, wherein said microprocessor is further programmed to instruct diagonal cursor movement on the display screen when first direction rotation is sensed in a first wheel, substantially opposite direction rotation is subsequently sensed in a wheel positioned adjacent to said first wheel and then substantially first direction rotation is thereafter sensed in the wheel positioned catercorner to the first wheel.

12. The handheld electronic communication device as recited in claim 2, further comprising said four-wheeled user input device being mounted atop a depressibly actuable platform.

13. The handheld electronic communication device as recited in claim 1, wherein at least one of the four rotatable wheels is depressibly actuable for initiating execution of a corresponding programmed application on the handheld electronic communication device.

14. The handheld electronic communication device as recited in claim 1, wherein each of the four rotatable wheels is depressibly actuable for initiating execution of a respectively corresponding programmed application on the handheld electronic communication device.

15. The handheld electronic communication device as recited in claim 1, wherein each of the four rotatable wheels is rotatably mounted upon a respective non-rotatable axle and a top end of each axle is exposed with a device function indicia associated therewith.

16. The handheld electronic communication device as recited in claim 15, wherein at least one of the non-rotatable axles has a top end marked with indicia for telephone call initiation.

17. The handheld electronic communication device as recited in claim 15, wherein at least one of the non-rotatable axles has a top end marked with indicia for telephone call end.

18. The handheld electronic communication device as recited in claim 15, wherein at least one of the non-rotatable axles has a top end marked with indicia for menu display.

19. A method for executing cursor navigation on a display screen of a handheld electronic communication device, the method comprising:
  sensing, via at least one sensor, motion induced in any one of four rotatable wheels of a four-wheeled user input device located on a front face of the body, each of said four rotatable wheels mounted on a respective axle having a longitudinal axis oriented substantially perpendicular relative the front face of the body and said axles being arranged in a substantially square pattern in a plan view toward the front face of the body and wherein said body further comprises a display screen located above the four-wheeled user input device;
  inputting data indicative of the sensed motion to a microprocessor communicatively interposed between the at least one sensor and the display screen, said microprocessor being programmed to receive cursor guidance instructions via the sensor and to cause corresponding cursor movement on the display screen; and
  processing said input data into cursor guidance instructions that are outputted to the display screen and which affect at least one of x-direction and y-direction cursor movement on the display screen in correspondence with the sensed wheel motion.

20. A computer program for executing cursor navigation on a handheld electronic communication device, said program configured to run on a microprocessor in the handheld electronic communication device and programmed to receive data from at least one sensor indicative of sensed motion induced in any one of four rotatable wheels of a four-wheeled user input device located on a front face of the body, each of said four rotatable wheels mounted on a respective axle having a longitudinal axis oriented substantially perpendicular relative the front face of the body and said axles being arranged in a substantially square pattern in a plan view toward the front face of the body and wherein said body further comprises a display screen located above the four-wheeled user input device and wherein the microprocessor is communicatively interposed between the at least one sensor and the display screen, and said program being further programmed to cause at least one of x-direction and y-direction cursor movement on the display screen in correspondence with the sensed wheel motion.

* * * * *